United States Patent [19]

Diemeer

[11] Patent Number: 4,946,262

[45] Date of Patent: Aug. 7, 1990

[54] METHOD AND DEVICE FOR CONTROLLING A BEAM OF LIGHT

[75] Inventor: Martinus B. J. Diemeer, Zoetermeer, Netherlands

[73] Assignee: Staat der Nederlanden (Staatsbedrijf der Posterijen, Telegrafie en Telefonie), Hague, Netherlands

[21] Appl. No.: 273,468

[22] Filed: Nov. 17, 1988

[30] Foreign Application Priority Data

Nov. 23, 1987 [NL] Netherlands .................. 8702804

[51] Int. Cl.$^5$ ................................. G02F 1/01
[52] U.S. Cl. ..................... 350/362; 350/353; 350/355
[58] Field of Search ............ 350/353, 356, 96.11, 350/96.14, 362

[56] References Cited

U.S. PATENT DOCUMENTS 4,842,381  6/1989  Green ........................... 350/357

FOREIGN PATENT DOCUMENTS 0204493 12/1986 European Pat. Off. .
0218938  4/1987 European Pat. Off. .
0241967 10/1987 European Pat. Off. .
0290061 11/1988 European Pat. Off. .
61-56329  3/1986 Japan .

OTHER PUBLICATIONS

European Search Report–Appln. No. EP 88 20 2582.
Optics Letters–vol. 11, No. 3–Mar. 1986, pp. 180–182.
Barney et al., "Some New Side-Chain Liquid Crystalline Polymers for Non-Linear Optics", *SPIE*, vol. 682, *Molecular on Polymeric Opto-Electronic Materials,* 1986, pp. 56–64.
Stamatoff et al., Development of Polymeric Nonlinear Optical Materials, *SPIE,* vol. 682, *Molecular and Polymeric Opto-Electronic Materials,* 1986, pp. 85–92.
"Synthesis of Modular Arrays . . . ", *Macromolecules,* 1987, pp. 2232–2234.
Barney et al., "Second Harmonic Generation in Doped . . . ", *Advanced Optoelectronic Technology, 1987, pp. 2–7.*
Singer et al., "Organic Nonlinear Optical Materials", SPIE, vol. 578, *Integrated Optical Circuit Engineering* (1985) pp. 130–136.
Pantelis, "Organic Polymer Films for Nonlinear Optics", *Brit. Technol. Journal,* vol. 6, No. 3, Jul. 1988, pp. 5–17.
Singer et al., "Electro-Optic Polymer Glasses", SPIE, vol. 704, Integrated Optical Circuit Engineering IV (1986), pp. 241–246.
Liu, "Single-Mode-Fiber Evanescent Polarizer . . . ", *Optics Letters,* vol. 11, No. 3, Mar. 1986, pp. 180–182.

*Primary Examiner*—Eugene R. LaRoche
*Assistant Examiner*—Nathan W. McCutcheon
*Attorney, Agent, or Firm*—Frishauf, Holtz, Goodman & Woodward

[57] ABSTRACT

Method and device for controlling a beam off light (17), which is coupled in into a working layer (2) of electro-optical material and which is supplied to a working area (16). In a first optically conductive state the working area has a poling mode which differs from the one of the surrounding working-layer material (7), as a consquence of which other refractive indices will arise, due to which the working area will form a light waveguide through which the beam of light coupled in will be conducted (19) to a first glass fibre (22). In a second optically conductive state the working area has a poling mode which is equal to the one of its surroundings. Because of the fact that the refractive indices inside and outside the working area are not equal, the working area will not form a light waveguide, but (e.g.) a light insulator or a light reflector, by means of which the beam of light coupled in will be conducted to a second glass fibre (21). The quasi-stationary poling mode of the working area required for the first respectively the second optically conductive state will be reached by successively—warming up the working area to above the softening temperature—exciting an electric field in the working area, and—letting the working area cool down again. For poling the electric field has a value unequal to 0; for unpoling a value equal to 0.

8 Claims, 2 Drawing Sheets

METHOD AND DEVICE FOR CONTROLLING A BEAM OF LIGHT

BACKGROUND OF THE INVENTION

1. Field of the invention

The invention relates to a method for controlling a beam of light coupled in into an optically conductive working layer, which beam of light is supplied to a working area made of electro-optical material and lying within said working layer. Moreover, the invention relates to an optical control device for controlling a beam of light, and comprising a working layer into which a beam of light to be controlled is coupled in, and at least one working area of electro-optical material, to which the beam of light coupled in is supplied, as well as exciting means for exciting under the control of control means an electric control field in the working area.

2. State of the art

A method respectively a device of the aforesaid type is known from the European patent application EP No. 87200536 (STATE OF THE NETHERLANDS). This publication describes a device for controlling beams of light, in which case such a beam of light is coupled in into a working layer of electro-optical material and is supplied to a working area lying within that working layer. The electro-optical material is a thin film of a polymer dissolved in a volatile solvent, the polymer having a $\Delta n > 0.005$ at $1$ V/$\mu$m, where $\Delta n$ represents a change of refractive index n of the electro-optical material caused by the voltage applied to the electro-optic material. The film layer can be applied with a suitably chosen thickness (some $\mu$ms) by means of the spinning method. The electro-optical material of the working layer has everywhere one and the same optical axis, perpendicular to the plane of the working layer (id est the material is birefringent, the refractive index for light (ny) polarized in the y-direction—perpendicular to the surface of the working layer—being greater than the refractive index for light (nx) polarized in the x-direction—parallel to the surface of the working layer). An electric control field can be excited in the working area by exciting means (electrodes on both sides of the working area). This field is—just like the optical axis of the working-layer material—(substantially) at right angles to the working layer. When the working area is exposed to the electric control field, the refractive index of the working-layer material inside the working area will get another value than the refractive index of the material outside the working area. Owing to this the working area will form a light waveguide. It will, however, lose that function as soon as the field is removed. In this way the intensity of a beam of light supplied to such a working area is controlled by the electric field. By utilizing more working areas extending parallel to one another optical switches or direction couplers with e.g. two optically conductive states will be obtained: when there is a control field, the parallel working areas will form parallel light waveguides and the beam of light will be transmitted—by optical induction—from the one working area to the other working area; when there is no such field, no light waveguides will be formed and, consequently, the beam of light will not be transmitted.

For some applications the known method respectively device has the drawback that a working area will form a light waveguide only as long as there is the electric control field. After removing the control field the light waveguide will disappear again. Consequently, one of the two optically conductive states of the known device will be non-stationary (to wit when there is the control field); the other one will be quasi-stationary (when there is no control field).

SUMMARY OF THE INVENTION

The object of the present invention is to provide a method respectively an optical control device of the sort mentioned under A1., each of the two optically conductive states being quasi-stationary, id est each of the respective conductive states continuing after the (relevant) control field has been removed. The electro-optic material may, for example, be a thin film of a polymer having a $\Delta n > 0.005$ at $1$ V/$\mu$m produced from deposition of the polymer from a solution in a volatile solvent.

To that end the method according to the invention is characterized by the following sequential stages for reaching a first optically conductive state:
  the working area is warmed up to above its softening temperature,
  the working area is exposed to a first electric field,
  the working area is cooled down to below its softening temperature;
as well as by the following sequential stages for reaching a second optically conductive state, unequal to said first optically conductive state:
  the working area is warmed up to above its softening temperature,
  the working area is exposed to a second electric field, unequal to said first electric field,
  the working area is cooled down to below its softening temperature.

The working area is made of electro-optical material, id est optically conductive material comprising elements (particles, molecules) each in itself forming an electrical dipole. In this case the material can be "poled" or "unpoled", id est said dipoles can be (more or less) rectified ("poled"), or not rectified ("unpoled"), so rectified at random. In the event that the material is poled and, consequently, the dipoles are (more or less) rectified, the material will be birefringent, id est the refractive index nx for light polarized in the x-direction will have another value than the refractive index ny for light polarized in the y-direction. In the event that the material is unpoled and, consequently, the dipoles are rectified at random, the material will not be birefringent, id est the refractive indices nx and ny will be equal to each other.

Poled material is always poled in a certain direction: the direction of poling. Moreover, the material is always poled to a certain degree, from 0% (unpoled) ... 100% (maximally poled): the degree of poling (hereinafter unpoled material will be regarded as material poled with a degree of poling equal to 0). The direction of poling and the degree of poling together will be called "poling mode" in what follows. Consequently, a change in the poling mode implies a change in the refractive indices nx and ny.

The method according to the invention utilizes the property of the electro-optical working-area material that said dipoles can be directed by means of an electric field, due to which the refractive indices can be set. It is noted that in the known method described above use is made of another property of the electro-optical material, viz. that if an electric field is established in the direction of the (not changing) optical axis (=direction of poling) of the (working area) material, the refractive indices will change in conformity with the extent of the field established. According to the known method the poling mode of the working-area material will, consequently, remain unchanged, in contradistinction to the method according to the present invention, where on the contrary use is made of changes in the refractive index occurring due to changes in the poling mode. In the method according to the invention no explicit use is made of the effect used in the known method. It is noted, however, that the two effects can be used simultaneously.

For poling the working-area material it has to be warmed up first to above the softening temperature. Next the elements which have become movable due to said warming up are directed in conformity with the direction of the electric field established. The extent to which that happens (the degree of poling) is determined inter alia by the strength of the electric field. By cooling down said material the elements will remain fixed in the rectified state.

Just like the material can thus be poled by means of an electric field, that is brought from the unpoled state into a poled state, the material can be repoled respectively unpoled in the same way:

When repoling, (poled) material is brought from a first poling mode into a second poling mode (unequal to the first). The electric field, which is established after the material has been warmed up, has a direction and/or a value which causes a poling mode which differs from the original first poling mode of the material.

When unpoling (in fact a specific form of repoling), the material is brought from a poled state into the unpoled state. This will be achieved by establishing an electric field with a strength of 0 after the material has been warmed up, in other words, by not establishing a field after the material has been warmed up. So, the (poled) material is warmed up to above the softening temperature and then cooled down again. Because of the fact that after the elements have become movable the directing electric field is lacking (field strength =0), but nevertheless the elements will carry out (random) movements of heat due to the heat supplied, the elements will, after having cooled down, be fixed in an arbitrary direction. After cooling down the material will thus be unpoled.

In said first optically conductive state the working area is according to the method (warming up—field excitation—cooling down) described above brought into a quasi-stationary poling mode (unpoled or poled, dependent on the value and the direction of the first electric field), which differs from the poling mode (poled or unpoled) of the working-layer material surrounding the working area. The difference in poling mode results in a difference in the values of nx and ny, due to which a beam of light supplied to the working area can be conducted through (e.g.) the working area. In said second (=original) optically conductive state the working area has been brought into a second (equal to the original) quasi-stationary poling mode, which is identical to the poling mode of the surrounding working-layer material. So, in this second conductive state there will be no difference of poling mode between the working area and the rest of the working layer and, consequently, neither a difference of refractive indices. In consequence of this the working area in this second conductive state will lose its function as light waveguide.

According to the present invention it is feasible to use poled or unpoled working-layer material. For the sake of the first optically conductive state the working area can, when using poled working-layer material, either be unpoled (by omitting the electric field between the warming up and cooling down process), or repoled (so be brought into another poling mode by means of an electric field). In both cases the refractive indices nx/and ny are changed. The working-area material can be brought again into the original poling mode (equal to the poling mode of the rest of the working layer) by establishing after the warming up process an electric field, the value and the direction of which correspond with those of the original poling mode: when the working-area material was originally unpoled, the working-area material will be unpoled again in the way described above (warming up—cooling down), in the other case the working area will be repoled again by an electric field ($\neq 0$) to bring it into its original poling mode.

It is further noted that directing and fixing the optical axis of a working area inside a working layer, in order to effect a difference of refractive index, is known per se from the American patent specification U.S. No. 4438443 (INST. RADIOTEKNIKI I ELEKTRONIKI AKADEMII NAUK SSSR). The object of the method described in this patent specification is, however, different from the object of the present invention, for said method is employed for recording information (in a form—perceptible to e.g. the human eye—outside the working layer) on a medium in the form of discrete electrical signals, whereas the present invention, on the other hand, relates to the control of a beam of light inside the working layer.

The invention also provides an optical control device as mentioned under A1, characterized by heating means for warming up, under the control of said control means, the working area to above its softening temperature. The control means control the exciting means and the heating means in such a way that the device will reach a first respectively a second optically conductive state in a manner as described in what precedes.

The (local) poling respectively unpoling of the working area by means of the aforesaid cycle—warming up, field cooling down—can be achieved in different ways, to wit by local warming up and local field excitation, or
local warming up and integral field excitation, or
integral warming up and local field excitation;
in which cases "local" means "substantially limited to the working area", whereas "integral" means "extending to inside and outside the working area", it being noted that the integral warming up will be applicable only when use is made of unpoled working-layer material (for the fact is that when poled working-layer material is used, this material would have to be integrally unpoled as soon as it is—integrally—warmed up).

The heating means can be formed by e.g. a current waveguide through which an electric current is conducted or by a beam of light which irradiates the working area.

The exciting means can be formed by e.g. electrodes on either side of the working area, id est on one and the same side of the working layer or on both sides of it.

REFERENCES

EP No. 87200536 (STATE OF THE NETHERLANDS)
U.S. No. 4438443 (INST. RADIOTEKNIKI I ELEKTRONIKI AKADEMII NAUK SSSR)

EMBODIMENTS

1. Figures

Figures 4A, 4B:
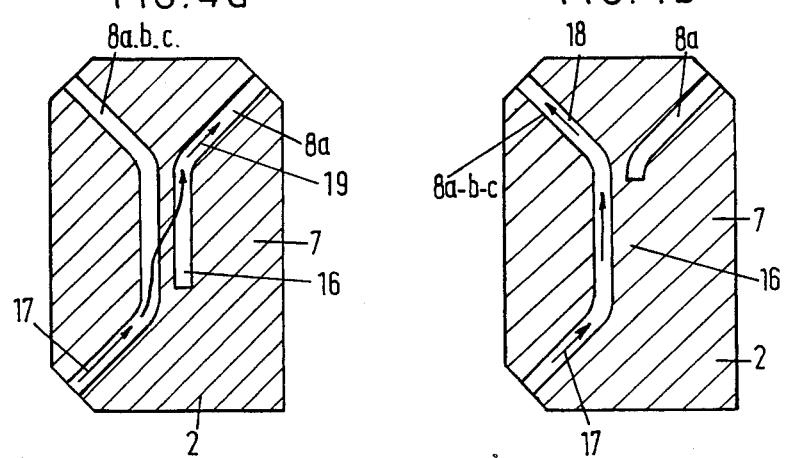

FIGS. 4a and 4b diagrammatically show the poling states of the working layer (id est the areas where the working layer is poled respectively unpoled) and the course of a beam of light coupled in into the working layer in the first respectively second optically conductive state of the first embodiment.

Figures 5A, 5B:
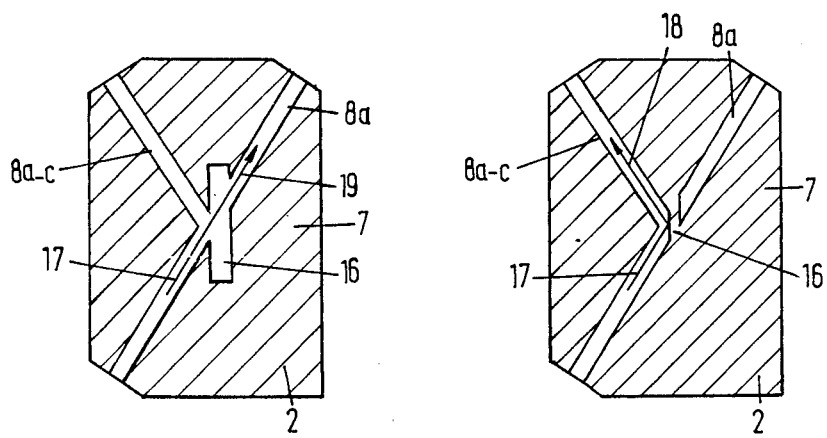

FIGS. 5a and 5b show the respective poling states and the course of the beam of light of the second embodiment.

2. Description

Figure 1:
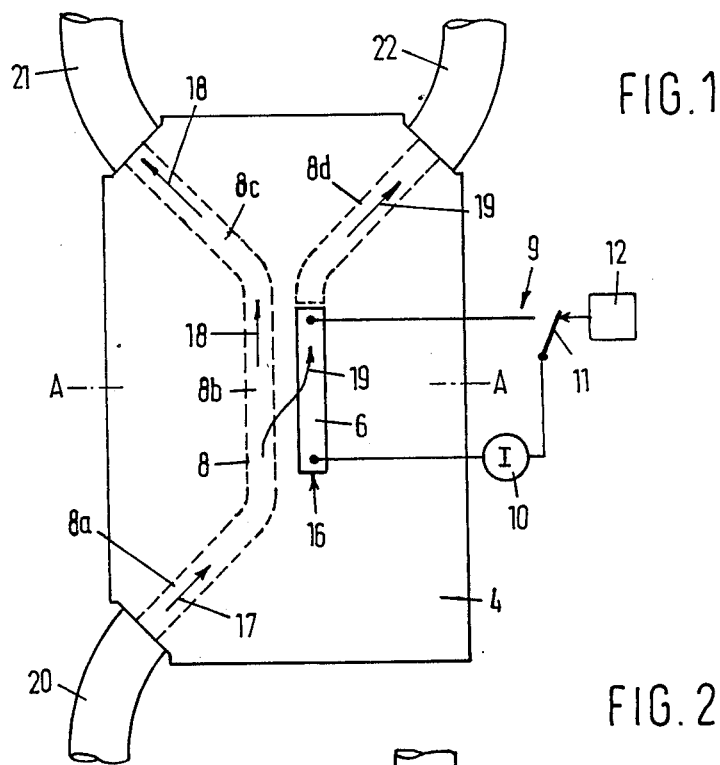
FIG. 1 shows a first embodiment of a device according to the invention, the aforesaid working area forming a controllable, quasi-stationary light waveguide.
Figure 2:
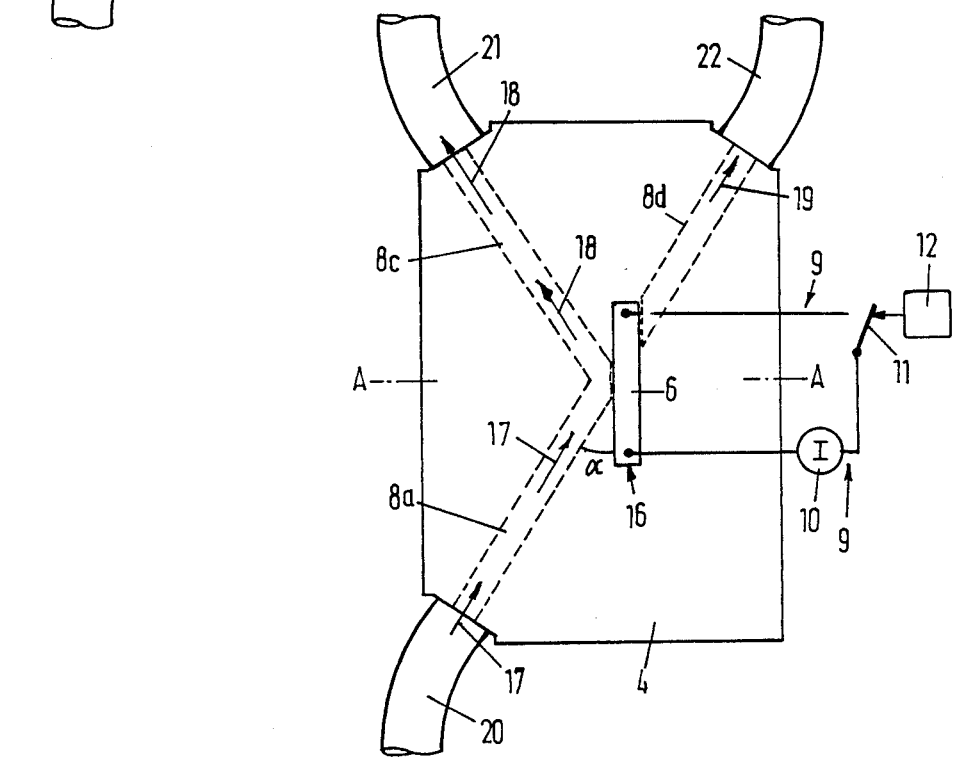
FIG. 2 shows a second embodiment of a device according to the invention, the working area forming a controllable, quasi-stationary light reflector.
Figure 3:
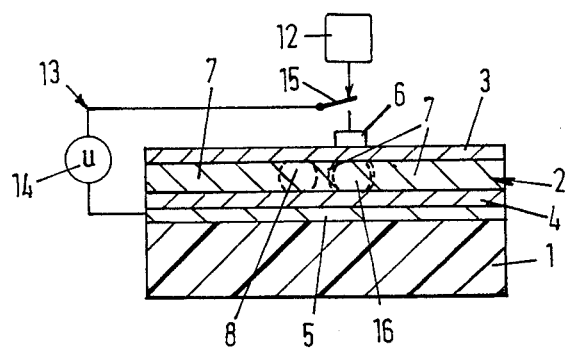
FIG. 3 shows a cross-sectional view of the two embodiments according to the line A—A.

In the following description of the embodiments as represented in FIG. 1 respectively FIG. 2 the cross-sectional view according to FIG. 3 is implicitly referred to.

The first embodiment (FIGS. 1 and 3) comprises a substrate 1 and on it a working layer 2 of electro-optical material, which is provided on both sides with an optical buffer layer 3 respectively 4. A first integral electrode 5 has been fixed between the working layer 2 and the substrate 1, and a second strip-shaped electrode 6 has been fixed on the other side of the working layer 2. The area between this electrode 6 and the integral electrode 5 forms the working area 16 of the device and can act as controllable, quasi-stationary light waveguide, as will be further explained hereinafter. The strip-shaped electrode 6 is incorporated in a current circuit 9, which further consists of a source of current 10 and a switch 11, which is controlled by a control unit 12. Moreover, the electrode 6 is incorporated in a voltage circuit 13, which further consists of the integral electrode 5, a voltage source 14 and a switch 15, which is also controlled by the control unit 12 (it is noted that the switches 11 and 15 can be controlled independently of each other). The working layer 2 consists of a material 7 which is substantially unpoled; it comprises, however, band-shaped areas 8, which, on the other hand, are (permanently) poled (this can be achieved—when initializing the device—by successively warming up the material to above the softening temperature, by directing the optical axis of the working-layer material within said band-shaped areas 8 by means of an electric field, and by subsequently cooling down the material again), as a result of which said areas 8 will have refractive indices (nx, ny) which are different from the refractive indices of the surrounding working-layer material 7 (when making use of a horizontally polarized beam of light 17, nx will have to be higher, when utilizing a vertically polarized beam of light 17, ny will have to be higher). Owing to this the areas 8 will form permanent light waveguides. These light waveguides consist of the light waveguide 8a-8b-8c to which on the one hand a glass fibre 20 and on the other hand a glass fibre 21 is connected, as well as of the light waveguide 8c, which on the one hand joins the working area 16 and on the other hand is connected to the glass fibre 22. The portion 8b of the light waveguide mentioned first runs parallel to and at a short distance from the working area 16. A beam of light 17 is coupled in into the working layer 2 by the glass fibre 20 and supplied to the working area 16 via the light waveguide 8a.

The device knows a first and a second optically conductive state:

The first conductive state will be reached by poling the (unpoled) working area 16. This poling takes place as follows:

The control unit 12 closes the switch 11, due to which a current will start flowing through the electrode 6. This current warms up the material under the working area 16 to above the softening temperature, as a result of which the material will become weak.

Next the control unit 12 closes the switch 15, due to which an electric field will be excited in the working area 16, which electric field (preferably) has the same direction and value as the above-mentioned field with which the permanent light waveguide 8 was (initially) poled. The working area 16 is poled by this field in such a way that its poling mode will be identical to the poling mode of the permanent light waveguides 8.

Subsequently the control unit 12 opens the switch 11 again, as a result of which the current through the electrode 6 will be interrupted and the working area 16 will cool down to below the softening temperature. In consequence of this the elements of the working area rectified by the electric field will be fixed.

Finally the control unit 12 opens the switch 15, due to which the electric field in the working area 16 ceases to exist. This last stage is not necessary, because of the fact that for the poling mode of the working-area material it does not matter whether there is the electric field or not; for the elements of the material have been fixed.

The refractive indices of the material of the working area 16 thus poled are unequal to those of the unpoled working-layer material 7, but equal to those of the (correspondingly poled) permanent light waveguide 8. Because of the fact that the portion 8b of the light waveguide 8a-8b-8c is situated close along the working area 16, the beam of light 17 will induce in this (poled) working area 16 a beam of light 19, which is conducted further to the glass fibre 22 through the permanent light waveguide 8d joining the working area 16. So, in this first optically conductive state there is an optical connection between the glass fibres 20 and 22 and no optical connection between the glass fibres 20 and 21.

The second conductive state will be reached by unpoling the working area 16 again. This unpoling takes place as follows:

The control unit 12 closes the switch 11, due to which a current will start flowing through the electrode 6. This current warms up the material under the working area 16 to above the softening temperature, as a result of which the material will become weak. Owing to the heat supplied—in the absence of an electric field—the elements will start moving (at random) and, consequently, lose their equal direction of optical axis.

Subsequently the control unit 12 opens the switch 11 again, as a result of which the current through the electrode 6 will be interrupted and the working area 16 will cool down to below the softening temperature. As a result of this the elements will be fixed in their last—arbitrary—position (direction). After the working area 16 has thus been unpoled its refractive indices will no longer distinguish themselves from those of the remaining part 7 of the working layer 2. In consequence of this the working area 16 in this second optically conductive state will no longer form a light waveguide. In this state the beam of light 17 will go through the whole permanent light waveguide 8a-8b-8c (18) to glass fibre 21, but it will not manifest itself as beam of light 19 in the permanent light waveguide 8d and in the glass fibre 22. So, in this second optically conductive state there will be an optical connection between the glass fibres 20 and 21, but no optical connection between the glass fibres 20 and 22.

As for its structure the second embodiment (FIGS. 2 and 3) corresponds for the greater part with the first embodiment. In this embodiment the beam of light 19 is, however, not supplied parallel to the working area 16, via the permanently poled light waveguide 8a, as in the preceding embodiment, but at a certain sharp angle $\alpha$.

In the first optically conductive state the working area 16 is poled—just like in the preceding embodiment. This takes place, as explained hereinabove, by closing the switches 11 and 15 and then opening them again (first switch 11 and thereafter switch 15). So, in the first conductive state the working area 16 is, just as the permanent light waveguide 8, poled (in the same poling mode). Consequently, the beam of light 17 supplied via the light waveguide 8a and the working area 16 will not experience a difference of refractive index; it will cross the working area 16 and enter the glass fibre 22 via the permanent light waveguide 8d. So, in this first optically conductive state there will be an optical connection between the glass fibres 20 and 22, whereas there is no optical connection between the glass fibres 20 and 21.

The second optically conductive state will be reached by unpoling the working area 16 again—just like in the preceding embodiment. This takes place, as explained hereinabove, by successively opening and closing again the switch 11 (the switch 15 remains open because of the fact that the electric field in the working area 16 has now to be equal to 0). The working area 16 thus unpoled has refractive indices (nx and ny) which differ from those of the permanently poled light waveguides 8. Consequently, the beam of light supplied to the working area via the light waveguide 8a will now be reflected by the working area 16 and will enter the glass fibre 21 as beam of light 18 via the light waveguide 8c. So, in this second optically conductive state there will be an optical connection between the glass fibres 20 and 21, whereas there is no optical connection between the glass fibres 20 and 22.

By way of illustration of what precedes the poling state (poled/unpoled) of the working layer 2 and the course of the beams of light 17 and 18 respectively 19 have been diagrammatically represented in the FIGS. 4a, b and 5a, b. FIG. 4a relates to the first embodiment in the first optically conductive state, FIG. 4b in the second conductive state. FIG. 5a relates to the second embodiment in the first optically conductive state, FIG. 5b in the second conductive state. In the figures the unpoled working-layer areas are indicated by way of hatching, whereas the poled areas are not hatched. Consequently, in the FIGS. 4a and 5a the working area 16 is not hatched (poled), whereas in the FIGS. 4b and 5b it is hatched (unpoled).

I claim:

1. Method for controlling a beam of light coupled into an optically conductive working layer, which beam of light is supplied to a working area made of solid electro-optical polymer material and lying within said working layer, characterized by the following sequential stages for reaching a first optically conductive state:
   the working area (16) is warmed up to above its softening temperature,
   the working area is exposed to a first electric field,
   the working area is cooled down to below its softening temperature;
as well as by the following sequential stages for reaching a second optically conductive state:
   the working area is warmed up to above its softening temperature,
   the working area is exposed to a second electric field, unequal to said first electric field,
   the working area is cooled down to below its softening temperature.

2. Optical control device for controlling a beam of light, and comprising a working layer into which a beam of light to be controlled is coupled in, and at least one working area of solid electro-optical polymer material, to which the beam of light coupled in is supplied, as well as exciting means for exciting under the control of control means an electric control field in the working area,
   characterized by the provision of heating means (6) for warming up, under the control of the control means (12), the working area (6) to above its softening temperature, and by said control means (12) being means for controlling said exciting means (5, 6) and said heating means (6) in a predetermined sequence in every operation of controlling a beam of light.

3. Optical control device according to claim 2, characterized in that the control means (12) is constituted as means for controlling the exciting means (5, 6) and the heating means (6) in such a way that for reaching a first optically conductive state successively:
   the working area (16) is warmed up to above its softening temperature,
   the working area is exposed to a first electric field,
   the working area is cooled down to below its softening temperature;
and in such a way that for reaching a second optically conductive state, unequal to said first optically conductive state, successively:
   the working area is warmed up to above its softening temperature,
   the working area is exposed to a second electric field, unequal to said first electric field,
   the working area is cooled down to below its softening temperature.

4. Optical control device according to claim 2, characterized by heating means (6) substantially limiting themselves to warming up the relevant working area (16).

5. Optical control device according to claim 2, characterized by exciting means (5, 6) substantially limiting themselves to exciting in the relevant working area (16).

6. Optical control device for controlling a beam of light, and comprising a working layer into which a beam of light to be controlled is coupled in, and at least one working area of solid electro-optical polymer material, to which the beam of light coupled in is supplied, as well as exciting means for exciting under the control of control means an electric control field in the working area, characterized by the provision of heating means (6) for warming up, under the control of the control means (12), the working area (6) to above its softening temperature, and by said control means (12) being means for controlling said exciting means (5, 6) and said heating means (6) in such a way that for reaching a first optically conductive state successively:

the working area (16) is warmed up to above its softening temperature, the working area is exposed to a first electric field, the working area is cooled down to below its softening temperature;

and in such a way that for reaching a second optically conductive state, unequal to said first optically conductive state, successively:

the working area is warmed up to above its softening temperature, the working area is exposed to a second electric field, unequal to said first electric field, the working area is cooled down to below its softening temperature.

7. Optical control device according to claim 6, characterized by heating means (6) substantially limiting themselves to warming up the relevant working area (16).

8. Optical control device according to claim 7, characterized by exciting means (5, 6) substantially limiting themselves to exciting in the relevant working area (16).

* * * * *